July 24, 1956 C. E. WEST 2,756,083
JOINT FOR INDICATING INSTRUMENT LINKAGE
Filed May 24, 1951 2 Sheets-Sheet 1
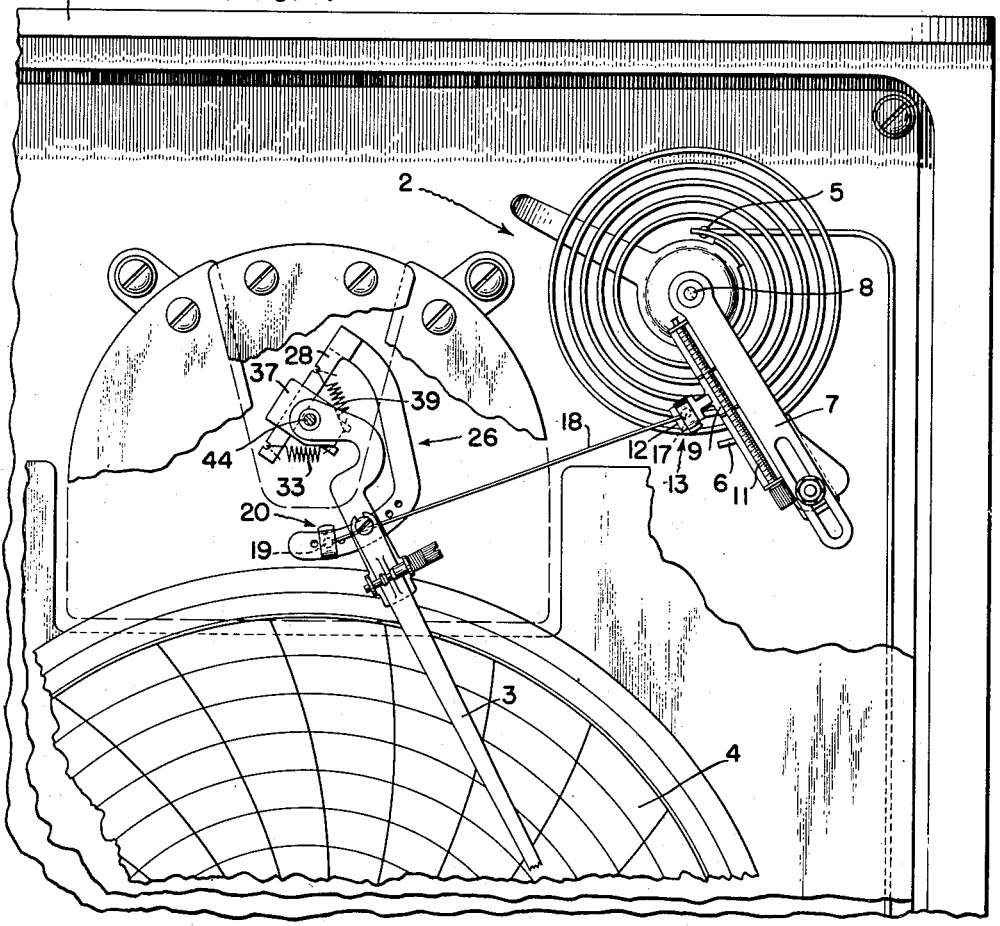
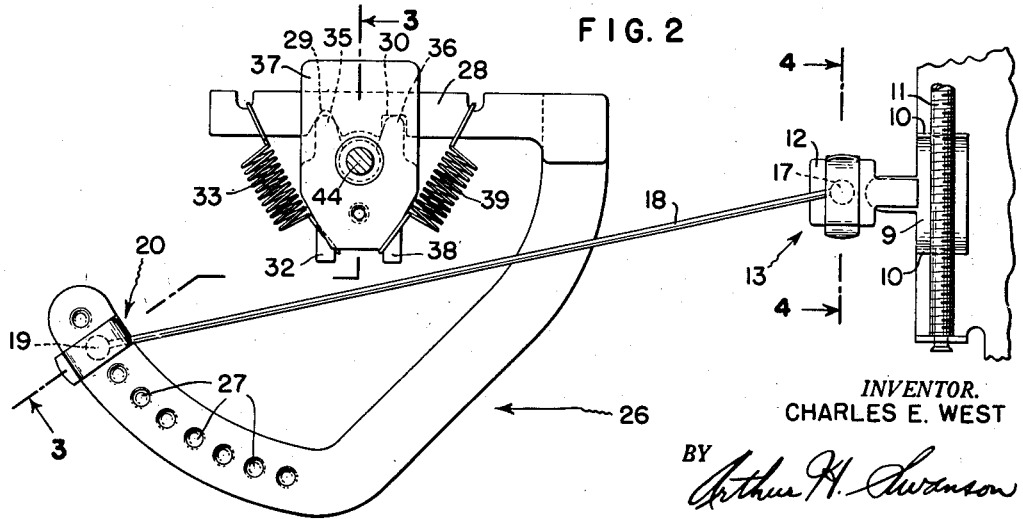
INVENTOR.
CHARLES E. WEST
BY Arthur H. Swanson
ATTORNEY.

July 24, 1956
C. E. WEST
2,756,083
JOINT FOR INDICATING INSTRUMENT LINKAGE
Filed May 24, 1951
2 Sheets-Sheet 2
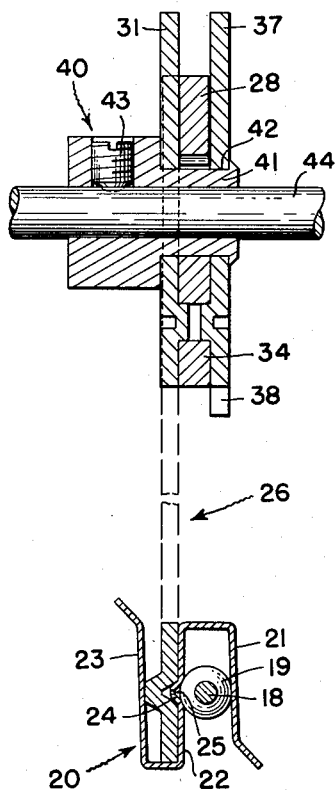
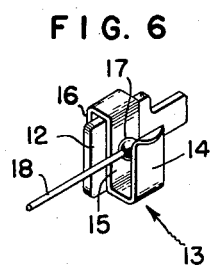
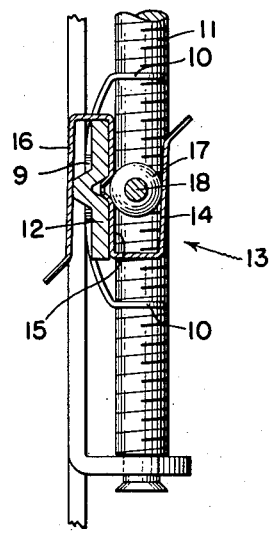
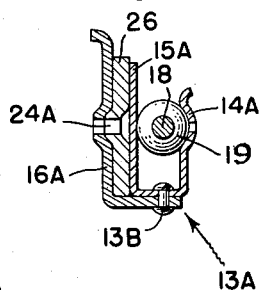
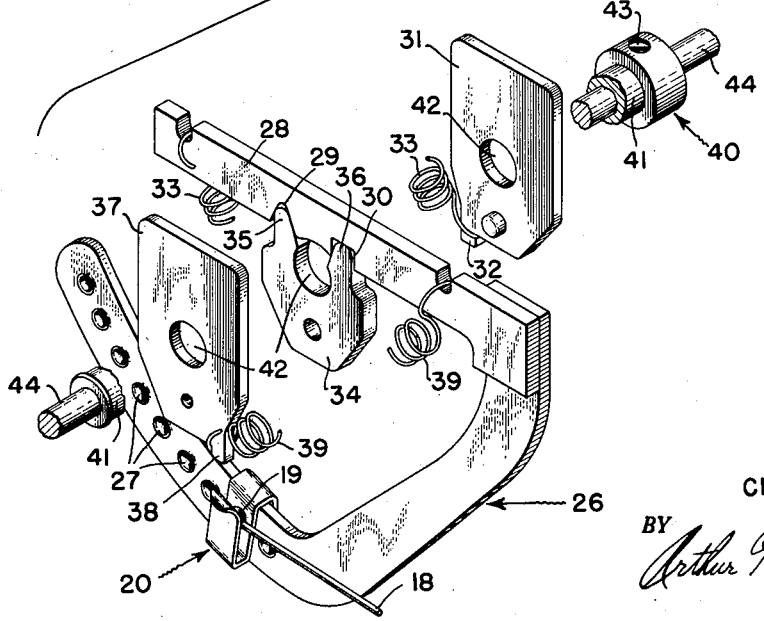
INVENTOR.
CHARLES E. WEST
BY
Arthur H. Swanson
ATTORNEY.

United States Patent Office 2,756,083
Patented July 24, 1956

2,756,083

JOINT FOR INDICATING INSTRUMENT LINKAGE

Charles E. West, Philadelphia, Pa., assignor to Minneapolis-Honeywell Regulator Company, Minneapolis, Minn., a corporation of Delaware Application May 24, 1951, Serial No. 227,970

1 Claim. (Cl. 287—89)

This invention relates to indicators and recorders. More specifically, it relates to instruments which have a driving element consisting of a Bourdon tube or spiral, a driven element consisting of an indicating pointer or recording pen, and a linkage therebetween to transmit the motion of the driving element to the driven element. The driving element is responsive to changes in the variable being measured. This variable is usually temperature, pressure, or rate of flow.

It is an object of this invention to provide such a linkage in which there are means for adjusting the length of the various elements of the linkage and thereby adjusting the overall length of the linkage so as to permit both the driving element and the driven element to be located in casings of various size or to be located in different positions in the same casing. In order that the linkage accurately transmit the motion, the connections between the various elements of the linkage must be positive and exactly located. In order to permit the adjustments to be readily made without the use of tools, these connections must be easily attached and detached, preferably simply by hand.

It is a further object of this invention to provide a spring clip having in an intermediate portion thereof an indentation adapted to receive in it a ball-shaped portion of the linkage so as to provide a ball and socket joint. This ball and socket joint is aligned with a second ball and socket formed by a rounded projection from the spring clip which interfits with a perforation in an element of the linkage so that the pivot formed by these two joints may be quickly and easily made or unmade and yet accurately located.

The various features of novelty which characterize this invention are pointed out with particularity in the claim annexed to and forming a part of this specification. For a better understanding of the invention, however, its advantages and specific objects attained with its use, reference should be had to the accompanying drawings and descriptive matter in which is illustrated and described a preferred embodiment of the invention.

In the drawings:

Fig. 1 is a partial front elevation of a meter with the cover of the casing removed.

Fig. 2 is a view on an enlarged scale of a portion of the linkage.

Fig. 3 is a substantially vertical cross section on an enlarged scale on line 3—3 of Fig. 2 viewed in the direction of the arrows.

Fig. 4 is a vertical cross section on the same scale as Fig. 3 on line 4—4 of Fig. 2 viewed in the direction of the arrows.

Fig. 5 is an exploded perspective view of parts of the linkage.

Fig. 6 is a perspective view of the S-shaped clip shown in Fig. 4, and

Fig. 7 is a vertical cross section of a modified form of clip shaped like a W.

The device of this invention comprises an instrument having a casing 1 usually in the form of a rectangular box having a front door or cover (not shown). In this casing is mounted a driving element (generally indicated at 2) comprising a Bourdon tube or spiral. Driving element 2 drives a linkage to be described more fully hereinafter and also drives a driven element comprising an indicator pointer or recording pen 3 which cooperates with a chart 4 rotated at a uniform speed.

Driving element 2 has its inner end 5 fixed or stationary. The outer end 6 is movable and is attached to a lever 7 which is centrally pivoted about a stationary pivot 8. This central pivot or support constrains the driving element 2 to a single mode of vibration and thus eliminates many undesirable movements not resulting from the variable being measured.

Lever 7 is attached to a substantially T-shaped plate 9 which has a pair of forwardly projecting, notched arms 10 engaging the manually adjustable screw 11. Plate 9 has in its base or vertical arm 12 an indentation in one face and a projection from the other.

Fig. 6 shows an S-shaped clip (generally indicated at 13) having one vertically extending arm 14, an intermediate parallel arm 15, and a third vertically extending parallel arm 16. On the face of the intermediate arm 15 opposite to arm 14 is an indentation or perforation of suitable size and shape to cooperate with a ball 17 formed on one end of a link 18. A projection of suitable size and shape to enter the cavity in the face 12 extends from the face of intermediate arm 15 which is opposite arm 16. Since the perforation and the projection in arm 15 are formed by a single operation, they are aligned and necessarily cause the cavity in arm 12 to be aligned with the ball 17 and thus form an accurately located pivot.

Fig. 3 shows that link 18 has at its opposite end a ball 19.

A second S-shaped spring clip (generally indicated at 20) has a vertical extending arm 21, an intermediate parallel arm 22, and a third parallel arm 23. Projecting from one side of arm 22 is a projection 24. Located in the opposite face of arm 22 is a cavity 25 of suitable size and shape to cooperate with ball 19.

Fig. 7 shows a modified form of spring clip in the shape of a W rather than an S. This clip is generally indicated at 13A. It has one vertically extending arm 14A, an intermediate vertically extending arm 15A, and a third vertically extending parallel arm 16A. The one vertically extending arm 14A has in its face opposite to arm 15A an indentation or perforation of suitable size and shape to cooperate with ball 19 formed on one end of link 18. An indentation of suitable size and shape is located in that face of third arm 16A to receive in it a projection 24A extending from one face of lever 26. Since the indentations or perforations in arm 14A and the indentations or perforations in arm 16A are aligned, the joint formed by the ball 19 and the projection 24A are also aligned and thus form an accurately located pivot. Clip 13A is formed in two parts, one being U-shaped and comprising arms 14A and 15A while the other is L-shaped and comprises arm 16A. These two parts are held together by a rivet 13B.

Figs. 1, 2, 3, and 5 show a lever (generally indicated at 26) having a plurality of perforations or cavities 27 in it. Cavities 27 are of suitable size to receive the projections 24 therein. Projection 24 and cavity 25 are aligned. When ball 19 is located in cavity 25, ball 19 is necessarily aligned with the cavity 27 into which the projection 24 is located. The pivot formed by ball 19 and the selected perforation 27 is accurately aligned.

At its opposite end lever 26 has an arm 28 which contains the V-shaped notch 29 and the rectangular notch 30. Cooperating with notches 29 and 30 is a pivot formed of an outer plate 31 having a projection 32 thereon which serves for the connection of one end of a spring 33 secured at its other end to arm 28 of lever 26. The pivot also is made up of a center plate 34 having projections 35 and 36 extending upwardly therefrom so as to be received by notches 29 and 30. The pivot also comprises a third plate 37 having a projection 38 extending downwardly therefrom so as to receive one end of spring 39 secured at its opposite end to arm 28 of lever 26. Plates 31, 34, and 37 are secured together so that they form one unitary element. The side plates 31 and 37 abut the sides of arm 28 and guide it in its rocking motion about the projections 35 and 36 and a bushing (generally indicated at 40). Bushing 40 has a smaller diameter 41 which has a forced fit for engagement with holes 42 in plates 31, 34, and 37 so that the pivot is fast on bushing 40 which is secured by means of pin 43 to index shaft 44. Shaft 44 carries the indicator or recorder hand 3 (Fig. 1).

*Operation*

The driving element is responsive to changes in the variable being measured. This variable is usually temperature, pressure, or rate of flow. When a change in the variable being measured is felt by Bourdon tube or spiral 2, it causes the free end 6 to rotate and thereby turn lever 7 about its central, stationary pivot 8. Rotation of lever 7 carries T-shaped plate 9 with it so that clip 13 moves link 18 by means of the ball 17 secured in clip 13. The opposite end of link 18 is detachably secured by means of clip 20 to lever 26 because ball 19 is held between arms 21 and 22 of clip 20 while lever 26 is secured to clip 20 between arms 22 and 23 of clip 20. Relatively slow movement of driving element 2 and consequently of lever 26 causes lever 26 to turn index shaft 44 without extending springs 33 or 39. However, if an excess torque occurs, such as an undesired vibration due to a sudden extraneous motion of driving element 2 or a part of the linkage, lever 26 turns in the direction of the torque and stretches either spring 33 or 39 permitting arm 28 to rock about projection 35 or projection 36 as the case may be. This stretching of springs 33 and 39 permits overtravel of the driving element 2 without corresponding false movement of the indicator or recorder pen 3.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claim, and that in some cases certain features of the invention may sometimes be used to advantage without a corresponding use of other features.

Having now described my invention, what I claim as new and desire to secure by Letters Patent is as follows:

A linkage providing a universal joint and including, a link formed of a single piece of metal and having an integral ball-shaped terminal section, a lever having a plurality of cavities in it, and a spring clip comprising three substantially parallel portions, two of said portions being spaced a lesser distance apart than the diameter of said ball-shaped terminal section and between which is positioned said ball-shaped terminal section, one of said portions being provided with an opening of lesser diameter than the diameter of said ball-shaped section for the purpose of providing a seat on which said ball-shaped section may rock, one of said two portions and said third portion being spaced a lesser distance apart than the width of said lever and between which is positioned said lever, one of said portions being provided with a projection interfitting with one of the cavities in said lever and aligned with said ball-shaped section, thereby providing a yieldingly rockable connection between said link and said lever.

References Cited in the file of this patent

UNITED STATES PATENTS

| | | |
|---|---|---|
| 1,425,089 | Henry | Aug. 8, 1922 |
| 1,909,857 | Eshbaugh | May 16, 1933 |
| 2,173,155 | Bertrand | Sept. 19, 1939 |
| 2,235,976 | Best | Mar. 25, 1941 |
| 2,242,021 | Ball | May 13, 1941 |
| 2,502,776 | Burdick | Apr. 4, 1950 |
| 2,534,569 | Bowditch | Dec. 19, 1950 |
| 2,561,969 | Bowditch | July 24, 1951 |